United States Patent [19]

Matsui

[11] Patent Number: 5,151,857
[45] Date of Patent: Sep. 29, 1992

[54] DICTIONARY LINKED TEXT BASE APPARATUS

[75] Inventor: Kunio Matsui, Kawasaki, Japan

[73] Assignee: Fujitsu Limited, Kawasaki, Japan

[21] Appl. No.: 629,741

[22] Filed: Dec. 18, 1990

[30] Foreign Application Priority Data

Dec. 18, 1989 [JP] Japan .................................. 1-327671

[51] Int. Cl.[5] ............................................ G06F 15/38
[52] U.S. Cl. ..................................................... 364/419
[58] Field of Search ................................ 364/419, 900

[56] References Cited

U.S. PATENT DOCUMENTS

| | | | |
|---|---|---|---|
| 4,703,425 | 10/1987 | Muraki | 364/419 |
| 4,849,898 | 1/1989 | Adi | 364/419 |
| 4,862,408 | 8/1989 | Zamora | 364/900 |
| 4,868,750 | 7/1989 | Kucera | 364/419 |
| 4,887,212 | 12/1989 | Zamora | 364/419 |
| 4,931,935 | 6/1990 | Ohira | 364/419 |
| 4,994,967 | 2/1991 | Asakawa | 364/419 |
| 5,007,019 | 4/1991 | Squillante | 364/900 |

*Primary Examiner*—Dale M. Shaw
*Assistant Examiner*—Andrew Bodendorf
*Attorney, Agent, or Firm*—Staas & Halsey

[57] ABSTRACT

This invention pertains to a dictionary-linked text base apparatus having a text searching function and text searching methods using this apparatus at various levels. This realizes a searched result with a higher degree of accuracy and, by linking a text base with an electronic dictionary, this invention enables searches at three levels: all texts containing the morpheme included in a searched object word at a morpheme level; all texts related to the grammatical attribute of the item in the electronic dictionary matching or including the morpheme at a syntactical level; and all texts related to no less than one concept of the item in the electronic dictionary at a semantic level. The invention includes an electronic dictionary for storing, in correspondence with an identifier for each item, no less than one morpheme identifier forming the item, an identifier of the grammatical attribute of the item, and a concept identifier. In addition, it includes a relative information part for showing an identifier for the related text in the electronic dictionary, in correspondence with each of the morpheme identifiers, the grammatical attribute identifier and the concept identifier in the electronic dictionary.

11 Claims, 14 Drawing Sheets

FIG. 5

MORPHEME TABLE 16

| MID | ELEMENT | DID1 | TID1 |
|---|---|---|---|
| ⋮ | | | |
| 000185 | HA | ...... | 401006,... |
| 000186 | HE | ...... | 401006,... |
| 000261 | KARE | ...... | 401006,... |
| 000332 | IKU | 200661 | 401006,... |
| 000412 | TOKYO | ...... | 401006,... |
| | | 200912 | 401006,... |
| ⋮ | | | |

GRAMMATICAL ATTRIBUTE TABLE 17

| GID | ELEMENT | DID2 | TID2 |
|---|---|---|---|
| ⋮ | | | |
| 000005 | PRONOUN | 200661 | 401006,... |
| 000006 | PARTICLE | ...... | 401006,... |
| 000008 | GEOGRAPHICAL NAME | 200912 | 401006,... |
| 000013 | VERB | ...... | 401006,... |
| ⋮ | | | |

CONCEPT TABLE 18

| CID | ELEMENT | DID3 | TID3 |
|---|---|---|---|
| ⋮ | | | |
| 102213 | THAT MAN | 200661 | 401006,... |
| 102214 | SOMETHING AT FAR AWAY | 200661 | ...... |
| 103457 | A PLACE NAMED TOKYO | 200912 | 401006,... |
| 103682 | HEADING FOR DESTINATION | ...... | 401006,... |
| 103683 | SOMETHING BEING IN PROGRESS | ...... | ...... |
| ⋮ | | | |

ELECTRONIC DICTIONARY 2

| 200661 | (HE) |
|---|---|
| (MID4) | 000261 |
| (GID4) | 000005 |
| (CID4) | 102213, 102214 |

⋮

| 200912 | (TOKYO) |
|---|---|
| (MID4) | 000412 |
| (GID4) | 000008 |
| (CID4) | 103457 |

⋮

TEXT BASE 1

TID =401006

(MID5) 000261, 000185, 000412
  000186, 000332, (PERIOD)

(GID5) 000005, 000006, 000008
  000006, 000013
  (RELATIONAL INFORMATION)

(CID5)
  #ACTOR    #PLACE
  102213 ← 103682 → 103457

FIG. 12

SEARCHING REQUEST: MT (SEMANTIC LEVEL, MULTIVOCAL)
SEARCHING RESULT: O MT HA HONYAKUSHA NI KYOI DEATTA.
X MT NI YOTTE KIOKU SURU.
. . . . . . . . . . . . . . . . . . . . . . .

MORPHEME TABLE ⌐16

| MID | ELEMENT | DID1 | TID1 |
|---|---|---|---|
| : | | | |
| 000111 | MT | ...... | ...... |
| 000412 | TOKYO | ...... | ...... |
| 000413 | JOKYO | ...... | ...... |
| : | | | |

GRAMMATICAL ATTRIBUTE TABLE ⌐17

| GID | ELEMENT | DID2 | TID2 |
|---|---|---|---|
| : | | | |
| 000010 | PROPER NOUN | ...... | ...... |
| 000011 | NOUN 1 | ...... | ...... |
| 000012 | NOUN 2 | ...... | ...... |
| : | | | |

CONCEPT TABLE ⌐18

| CID | ELEMENT | DID3 | TID3 |
|---|---|---|---|
| : | | | |
| 103457 | A PLACE NAMED TOKYO | ...... | ...... |
| 103458 | VISITING | ...... | ...... |
| 103459 | MAGNETIC TAPE | ...... | ...... |
| 103460 | MACHINE TRANSLATION | ...... | ...... |

DID
MID4 (SINGULAR OR COMPLEX)
000111
GID4 (SINGULAR)
CID4 (SINGULAR OR COMPLEX)
103459 + 103460

ELECTRONIC DICTIONARY ⌐2

TID
MID5 (MORPHEME COLUMN)
000111
GID5 (GRAMMATICAL ATTRIBUTE STRUCTURE)
CID5 (CONCEPT STRUCTURE)
103460 . . . . . . . .

TEXT BASE ⌐1

FIG. 13

SEARCHING REQUEST: TOKYO (SEMANTIC LEVEL, INCLUDING WORD)
SEARCHING RESULT: KARE GA TOKYO NI KITA.
TOKYO NO YUJIN GA JOKYO SHITA.
. . . . . . . . . . . . . . . . . .

MORPHEME TABLE — 16

| MID | ELEMENT | DID1 | TID1 |
|---|---|---|---|
| ⋮ | | | |
| 000111 | MT | ...... | ...... |
| 000412 | TOKYO | ...... | ...... |
| 000413 | JOKYO | ...... | ...... |
| ⋮ | | ...... | ...... |

GRAMMATICAL ATTRIBUTE TABLE — 17

| GID | ELEMENT | DID2 | TID2 |
|---|---|---|---|
| ⋮ | | | |
| 000010 | PROPER NOUN | ...... | ...... |
| 000011 | NOUN 1 | ...... | ...... |
| 000012 | NOUN 2 | ...... | ...... |
| ⋮ | | ...... | ...... |

CONCEPT TABLE — 18

| CID | ELEMENT | DID3 | TID3 |
|---|---|---|---|
| ⋮ | | | |
| 103457 | A PLACE NAMED TOKYO | ...... | ...... |
| 103458 | VISITING | ...... | ...... |
| 103459 | MAGNETIC TAPE | ...... | ...... |
| 103460 | MACHINE TRANSLATION | ...... | ...... |

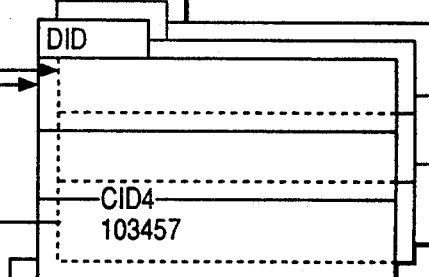

DID
CID4
103457
ELECTRONIC DICTIONARY — 2

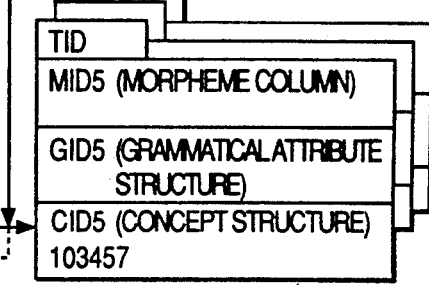

TID
MID5 (MORPHEME COLUMN)
GID5 (GRAMMATICAL ATTRIBUTE STRUCTURE)
CID5 (CONCEPT STRUCTURE)
103457
TEXT BASE — 1

FIG. 14

DICTIONARY EDITING REQUEST: ADDING "TOKYO DOME"
TEXT BASE: CHANGING CID5 "TOKYO" AND "DOME"
APPEARING IN SUCCESSION

MORPHEME TABLE 16

| MID | ELEMENT | DID1 | TID1 |
|---|---|---|---|
| 000111 | MT | ...... | ...... |
| 000412 | TOKYO | ...... | ...... |
| 097458 | DOME | ...... | ...... |

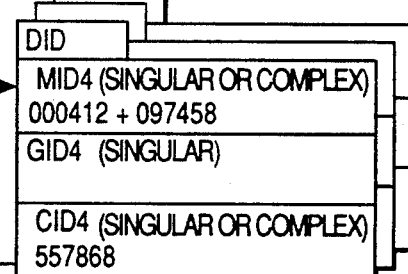

ELECTRONIC DICTIONARY 2

GRAMMATICAL ATTRIBUTE TABLE 17

| GID | ELEMENT | DID2 | TID2 |
|---|---|---|---|
| 000010 | PROPER NOUN | ...... | ...... |
| 000011 | NOUN 1 | ...... | ...... |
| 000012 | NOUN 2 | ...... | ...... |

CONCEPT TABLE 18

| CID | ELEMENT | DID3 | TID3 |
|---|---|---|---|
| 009856 | DOME | CHANGE | CHANGE |
| 103457 | A PLACE NAMED TOKYO | CHANGE | CHANGE |
| 103458 | VISITING | ...... | ...... |
| 557868 | A BASEBALL FIELD NAMED TOKYO DOME | ADDITION | ADDITION |

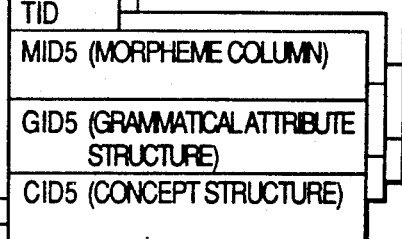

TEXT BASE 1

DICTIONARY LINKED TEXT BASE APPARATUS

TECHNICAL FIELD OF THE INVENTION

This invention pertains to a dictionary linked text base apparatus for enabling text searching at various levels in a text base apparatus having a text searching function.

BACKGROUND OF THE INVENTION

With recent advances in natural language processing techniques, a technique that makes information searching highly accurate is required. It is necessary to enable text searching at a level that matches the user's need and to feed back the searched result using a natural language processing technique.

An existing text base apparatus is configured to store as keywords words existing in a text base and searches the text by indexing these keywords.

However, in a search that uses keywords as indices, if a searched word has more than one meaning, the search is performed for a text that includes the semantics requested by the user, and the identification of the searched result depends on the user. Since a keyword setting depends on the text base creator, there is no consistency in the keywords and consistency in the searched result is not maintained.

Therefore, in existing text base apparatuses, searching a morpheme only (a minimum lingual unit having a meaning in a lingual system) has the defect that it cannot cope with multivocal words. Besides, since the text base is not linked with a dictionary, even if a new word is registered in a dictionary, the registration is not reflected in a prior text. Thus, consistency in the searched result cannot be maintained.

SUMMARY OF THE INVENTION

This invention aims at enabling text searching at each of the morpheme level, the syntactical level and the semantic level described later and realizing the searched result with higher degree of accuracy, by linking an electronic dictionary and a text base.

A feature of the present invention resides in a dictionary linked text base apparatus for enabling a text searching at a morpheme level in which, for a searched object word inputted in the form of a morpheme, all texts including the morpheme become the searched objects; a text searching at a syntactical level in which all texts related to the grammatical attribute of the registered item which is either the morpheme itself or the combined plurality thereof in the electronic dictionary, become the searched objects; and a text searching at a semantic level in which all texts related to no less than one concept of the registered item become the searched object: in a text base apparatus having a function for searching a text in a text base comprising: an electronic dictionary whose information comprises an identifier for the same morpheme as the item or a combined plurality of morphemes composing the item, an identifier for the grammatical attribute of the item, and an identifier for the concept of the item, in correspondence with an identifier for each registered item; and a relative information part showing an identifier for a related text in the text base and an identifier for a related text in the electronic dictionary for each of the morpheme identifier, the grammatical attribute identifier and the concept identifier appearing in the electronic dictionary.

BRIEF DESCRIPTION OF THE DRAWINGS

FIG. 5 is a diagram showing an embodiment of a data structure in a data controlling part.

FIG. 12 is a diagram showing an embodiment of a semantic level (multivocal word) searching process.

FIG. 13 is a diagram showing an embodiment of a semantic level (included word) searching process.

FIG. 14 is a diagram showing an embodiment of an electronic dictionary editing process.

DISCLOSURE OF THE INVENTION

This invention aims at enabling text searching at each of the morpheme level, the syntactical level and the semantic level described later, and realizing the searched result with a higher degree of accuracy by linking an electronic dictionary and a text base.

Figure 1:
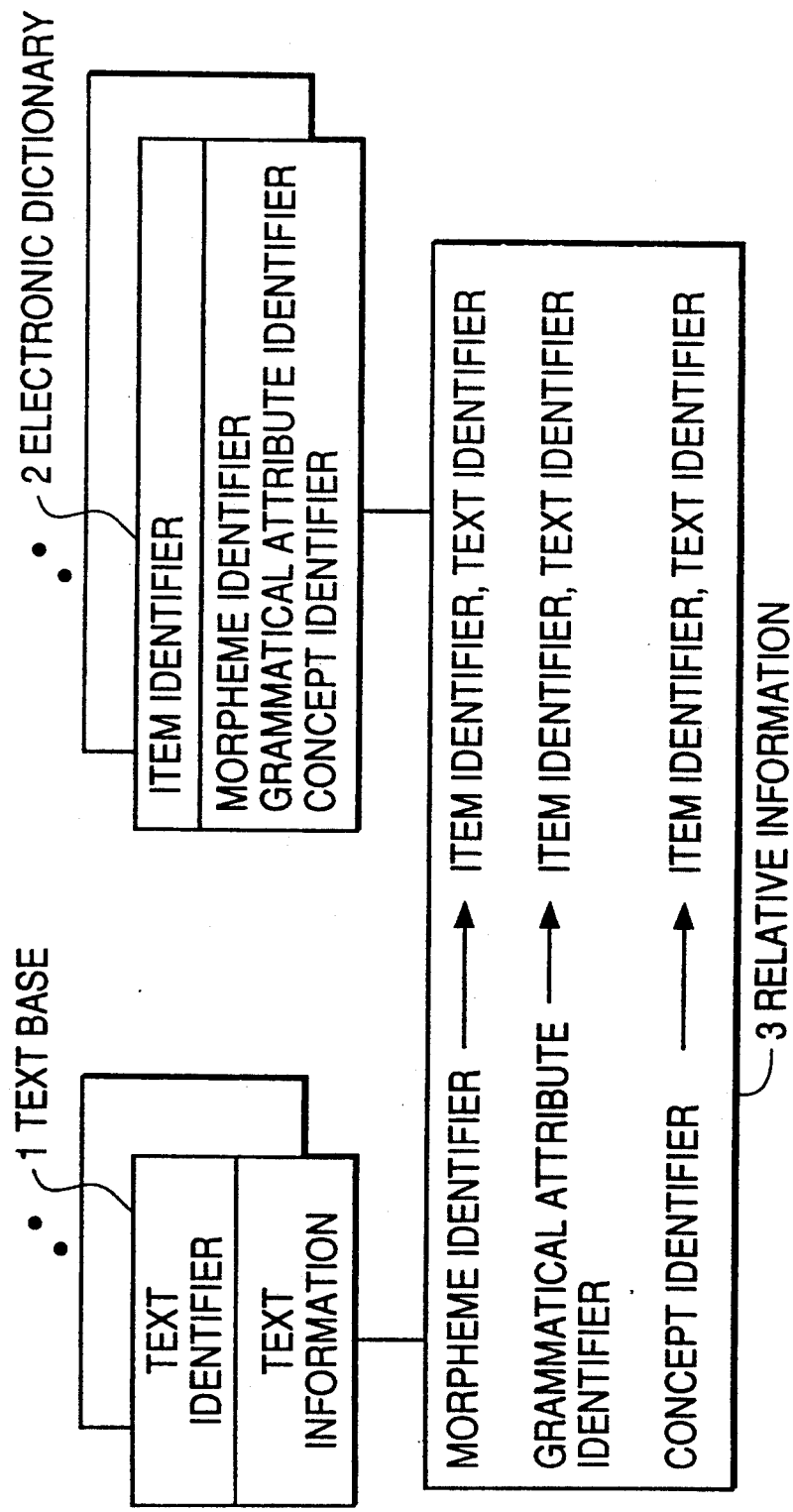
FIG. 1 is a principle block diagram of this invention.

FIG. 1 is a principle configuration diagram of this invention. In a dictionary-linked text base apparatus of this invention, a text base 1 and an electronic dictionary 2 are linked by a relative information part 3.

The electronic dictionary 2 stores an identifier for each registered item, as well as an identifier for the same morpheme as the item or a plurality of morphemes forming the item in a combination corresponding to the item identifier, an identifier for the grammatical attribute of the item and an identifier for a concept.

Here, the morpheme is a minimum lingual unit having a meaning in a lingual system, for example, and the registered item in the electronic dictionary 2 is a morpheme or a combination comprising a plurality of morphemes. The grammatical attribute shows a part of speech of the item, for example. Its concept refers to the concept of the item, such as "going somewhere".

In FIG. 1, the relative information part 3 stores an identifier of the text related in the text base and an identifier of the item in the electronic dictionary 2, in correspondence with each of the identifier for the morpheme arising within the electronic dictionary 2, the identifier for the grammatical attribute and the identifier for the concept.

In this invention, as described earlier, a text search at any of the three levels, i.e. the morpheme level, the syntactical level and the semantic level, is possible.

First, at the morpheme level, a text identifier is searched from the morpheme identifiers within the relative information part 3 for a searched object word inputted in a morpheme format, and the text is searched from the text base 1 using the text identifier.

Second, in a search at the syntactical level, all texts related to the same grammatical attribute, e.g. a geographical name, can be set as the searched object. As described earlier, each registered item in the electronic dictionary 2 is either a morpheme or a combination comprising a plurality of morphemes. In the relative information part 3, a morpheme identifier of the searched object word examines an identifier for the item matching the morpheme as the searched object word or including the morpheme, and the items within the electronic dictionary 2 are searched.

Then, using the identifier for the grammatical attribute corresponding to the identifier for the searched item, the identifier for the text related to the grammatical attribute identifier in the relative information part 3 is examined, and the texts within the text base 1 are searched by using the text identifier. At this time, all texts having a text identifier related to the same grammatical attribute identifier in the relative information part 3 can be made searched objects. Alternatively, by having the user select whether or not to make all the texts searched objects, an optional restriction on the searched objects becomes possible.

Finally, in a search at the semantic level, as with the search at the syntactical level, the item identifiers within the electronic dictionary 2 are examined from the morpheme identifiers of the searched object words in the relative information part 3, and the items within the electronic dictionary 2 are searched.

Then, all texts related to no less than one concept of the searched item can be made as the searched objects. For instance, when no less than two meanings exist for a registered item, a plurality of concept identifiers exist in the electronic dictionary 2, and a plurality of texts can be made as search objects for each of the plurality of concept identifiers by using the corresponding text identifier in the relative information part 3. Also, at this time, by having the user judge which concept matches the searching request, an optional restriction on the searched object texts becomes possible.

Thus, in this invention, by using the relative information part 3, a text search in any of the three levels, i.e. the morpheme level, the syntactical level, and the semantic level, becomes possible.

By reflecting the result of the changes caused by editing the text base 1 or the electronic dictionary 2 so that changes in the electronic dictionary 2 and the text base 1 are linked, consistency in the search related information is maintained, and the searched results can be realized highly accurately.

DESCRIPTION OF THE PREFERRED EMBODIMENTS

Figure 2:
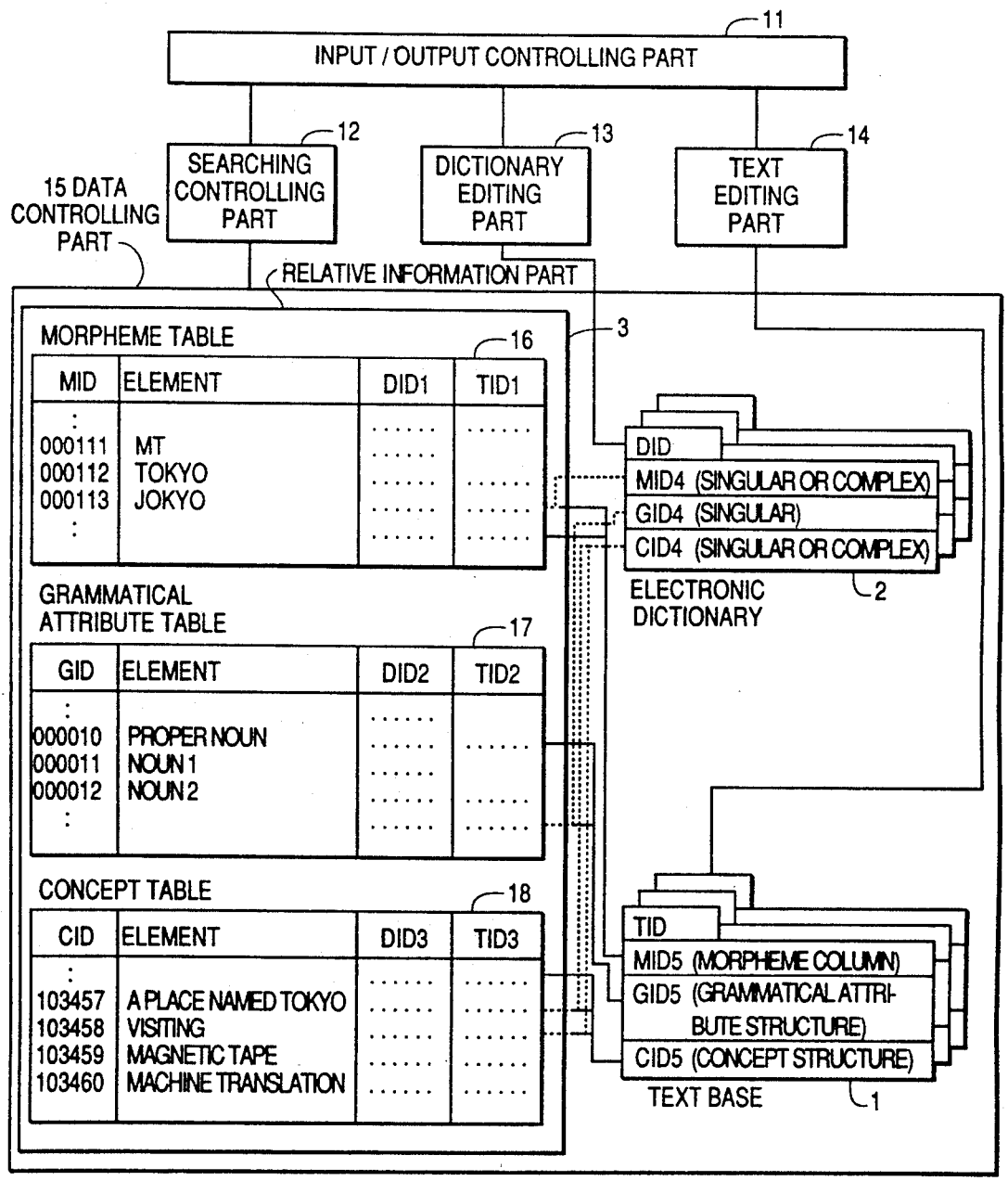
FIG. 2 is a block diagram showing the basic configuration of the dictionary-linked text base apparatus of this invention.

FIG. 2 is a block diagram showing the basic configuration of the dictionary-linked text base apparatus of this invention. In FIG. 2, 1 is a text base for storing the information related to the text of the searched objects, 2 is an electronic dictionary, 3 is a relative information part, and 11 is an input/output controlling part for controlling the input and output including those of a man-machine interface, 12 is a searching controlling part for control related to searching processes, 13 is a dictionary editing part for control related to dictionary editing process, 14 is a text editing part for control related to text editing processes, and 15 is a data controlling part for controlling text-related information to which an access is made. Further, in the relative information part 3, 16 is a morpheme table, 17 is a grammatical attribute table, and 18 is a concept table.

The input/output controlling part 11 controls the input and output operations of the searching control part 12, the dictionary editing part 13 and the text editing part 14. The searching control part 12 sends the search request received from the input/output control part 11 to the data control part 15. The dictionary editing part 13 edits and controls the data in the electronic dictionary 2. The text editing part 14 edits and controls the data in the text base 1.

The morpheme table 16 in the relative information part 3 is what makes a lingual specific morpheme correspond with its identifier (MID).

The grammatical attribute table 17 coordinates grammatical attributes, such as parts of speech and syntactical elements in a set, e.g. showing which case is used, and has each set correspond to its identifier (GID).

The concept table 19 has the concept independent of the language correspond with its identifier (CID).

The electronic dictionary 2 is what makes the combiation of respective identifier for the morpheme, the grammatical attribute, and the concept correspond with the identifier (DID) for the dictionary items. In the electronic dictionary 2, although there is always one identifier for the grammatical attribute, there are cases in which a singular identifier or a synthesized complex plurality thereof is used for either the morpheme or the concept.

This is to correspond with a complex morpheme (a so-called idiomatic phrase) and a complex concept (a concept combined from a plurality of concepts). Either the identifier for the morpheme or that for the concept must always be singular.

The text base 1 is what makes the combination of the respective identifiers for the morpheme column, the grammatical attribute structure and the concept structure correspond with the identifier for the text (TID).

In FIG. 2, DID1 in the morpheme table 16 indicates the identifier DID for the item in the electronic dictionary 2. TID1 indicates the identifier TID in the text base 1. What DID2 and TID 2 in the grammatical attribute table 17 and DID3 and TID3 in the concept table 18 indicate are similar to the above.

Figure 3:
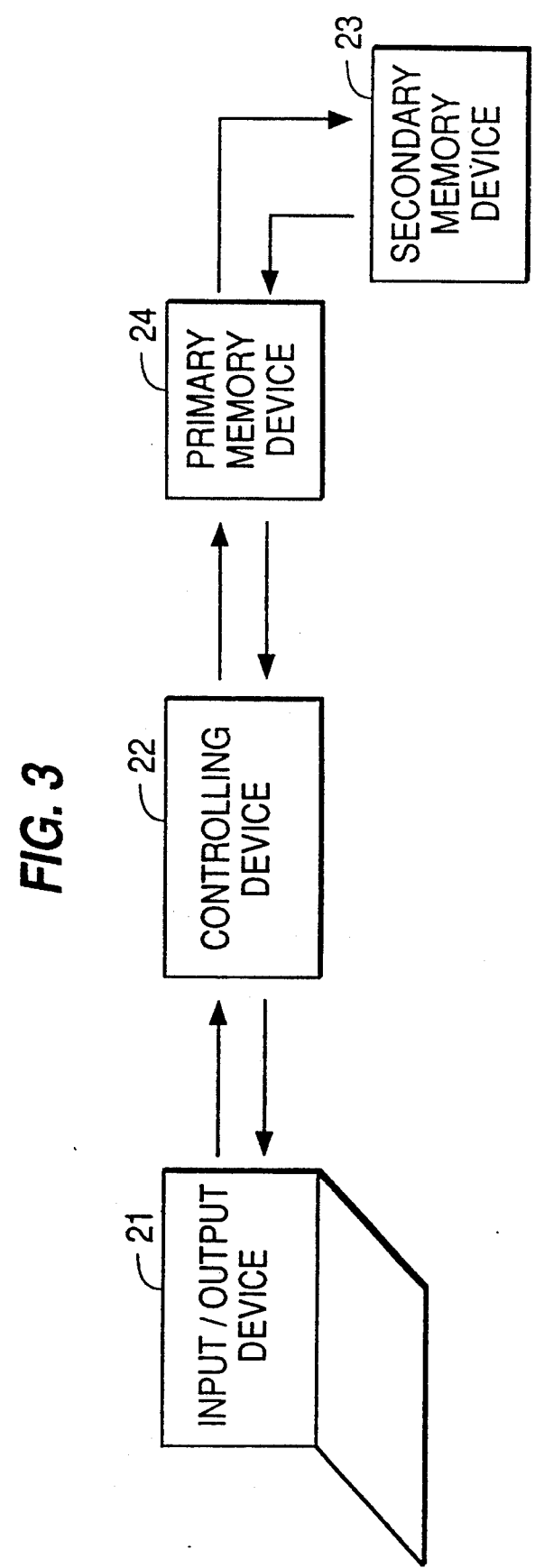
FIG. 3 is a block diagram showing the system configuration of the dictionary-linked text base apparatus of this invention.

FIG. 3 is a system configuration block diagram of the dictionary linked text base apparatus of this invention. This system comprises a controlling device 22 comprising input/output device 21 composing a part of the input/output controlling part 11 shown in FIG. 2, the part of the input/output controlling part 11 not included in the input/output device 21, the searching controlling part 12, the dictionary editing part 13, and a text editing part 14; a secondary memory device 23 for storing all information in the data controlling part 15; and a primary memory device 24 for storing the necessary information e.g. for searching the information in the data control part 15.

Figure 4:
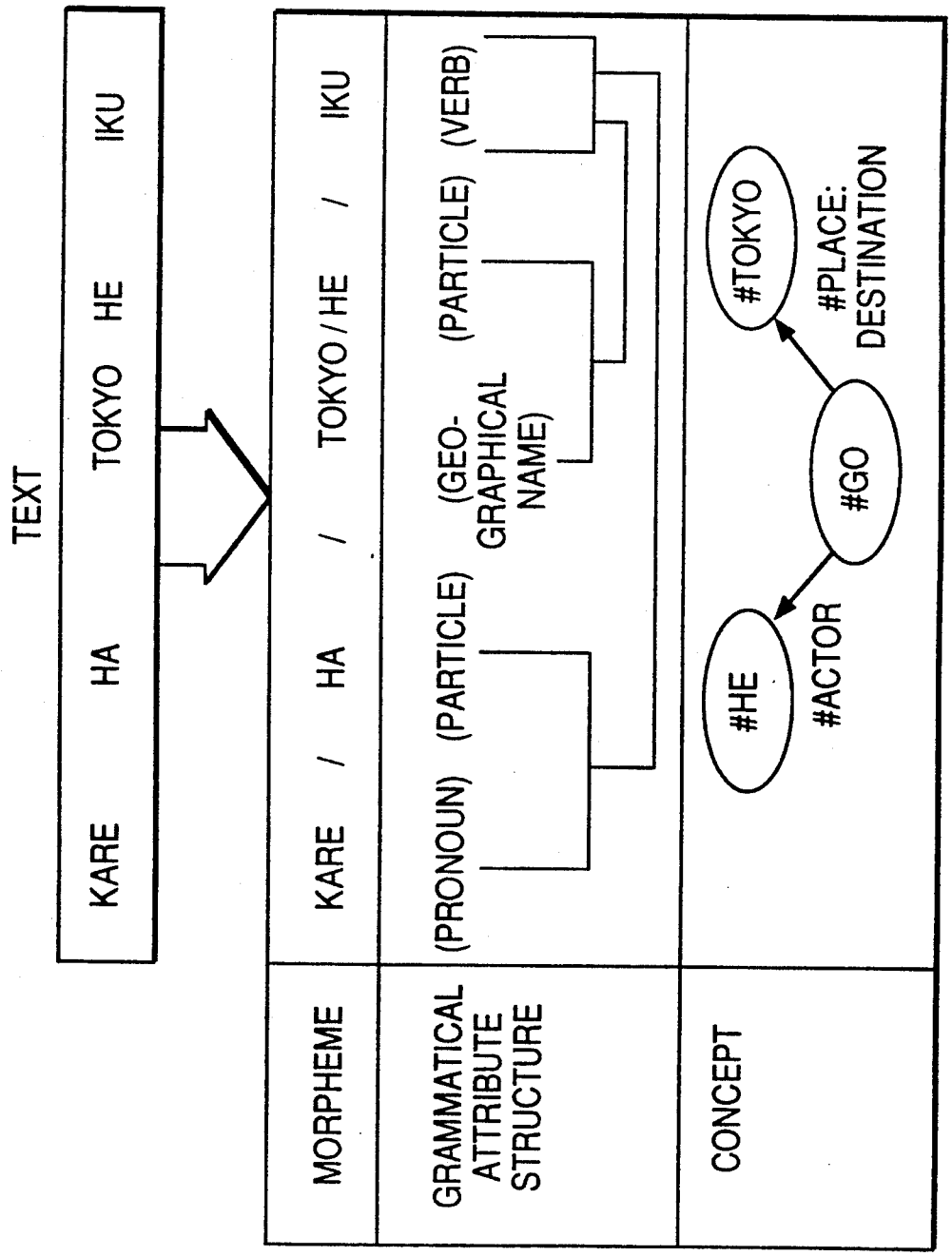
FIG. 4 is a diagram showing an example of the content of the information stored in a text base.

FIG. 4 shows an example of the content of the information stored in the text base 1. For example, assume the text of the searched object is "KARE HA TOKYO HE IKUλ (He goes to Tokyo.)". In this invention, each element of the information grasped from the respective sides of the morpheme, the grammatical attribute structure and the concept is set in the morpheme table 16, the grammatical attribute table 17, and the concept table 18 in the relative information part 3, as the related information. The electronic dictionary 2 controls the interrelations of these elements as those of the identifiers. The morpheme is any of the word element divisions of the sentence appearing in the text base 1 like "KARE/-HA/TOKYO/HE/IKU/λ", and has information on parts of speech such as pronoun and preposition or syntactical elements showing such as the interrelations of the words. The concept shows a semantic content away from a lingual expression.

FIG. 5 shows an embodiment of the data structure in the data controlling part 15. In FIG. 5, the morpheme table 16 is what makes lingual specific morphemes such as "KARE", "HA", "TOKYO", "HE", "IKU" and "" correspond with their identifiers MID. This table retains related information showing the text in the text base 1 and the related item in the electronic dictionary 2 as DID1 and TID1.

The grammatical attribute table 17 is what makes the grammatical attributes such as parts of speech and syntactical elements correspond with their identifiers GID. It retains related information showing the text in the text base 1 and the related item in the electronic dictionary 2 as DID2 and TID2.

The concept table 18 is what makes semantic elements which are independent of language correspond with their identifiers CID. This table retains related information showing the text in the text base 1 and the related item in the electronic dictionary 2 as DID3 and TID3.

In FIG. 5, when DID of the electronic dictionary 2 sees the DID200661, from the MID4, GID4 and CID4, it is known that the morpheme meaning "KARE", the grammatical attribute being a "pronoun", and the concepts meaning "that man" and "something far away" are linked.

In the text "KARE HA TOKYO HE IKU (He goes to Tokyo.)", data are retained in the form of MID5, GID5 and CID5 in the text base 1 shown in FIG. 5.

Figure 6:
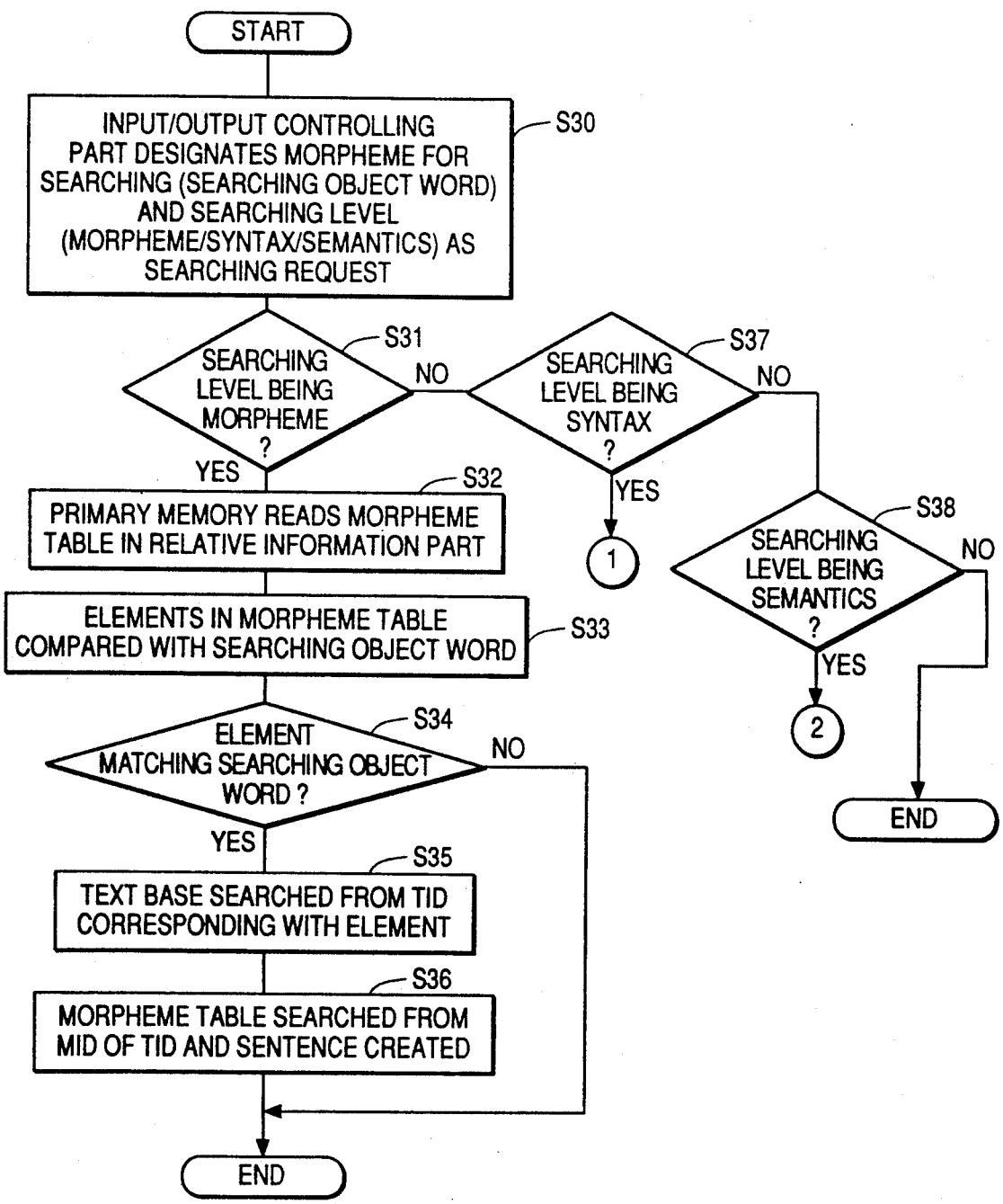
FIG. 6 is a flowchart showing an embodiment of a morpheme level searching process.

FIG. 6 is a flowchart of an embodiment of a searching process at the morpheme level. In FIG. 6, at step 30, any of the morpheme, the syntax and the semantics is specified for the searching level and the morpheme of searching, i.e. the searched object word, as the searching request from the input output controlling part 11 in FIG. 2. When the searching level is judged to be a morpheme level in step 31, the primary memory device 24 shown in FIG. 3 reads the morpheme table 16 in the relative information part 3 in step 32, and the elements in the morpheme table 16 and the searched object words are compared in step 33. Here, the searched object word is not limited to a single morpheme, but could be a combination comprising a plurality of morphemes.

If an element in the morpheme table 16 is detected to match the searched object word in step 34, the text base 1 is searched by using the text identifier TID corresponding with the element in step 35, and the morpheme table 16 is searched by using the morpheme identifier MID for the searched text and the text is created in step 36.

Figure 7:
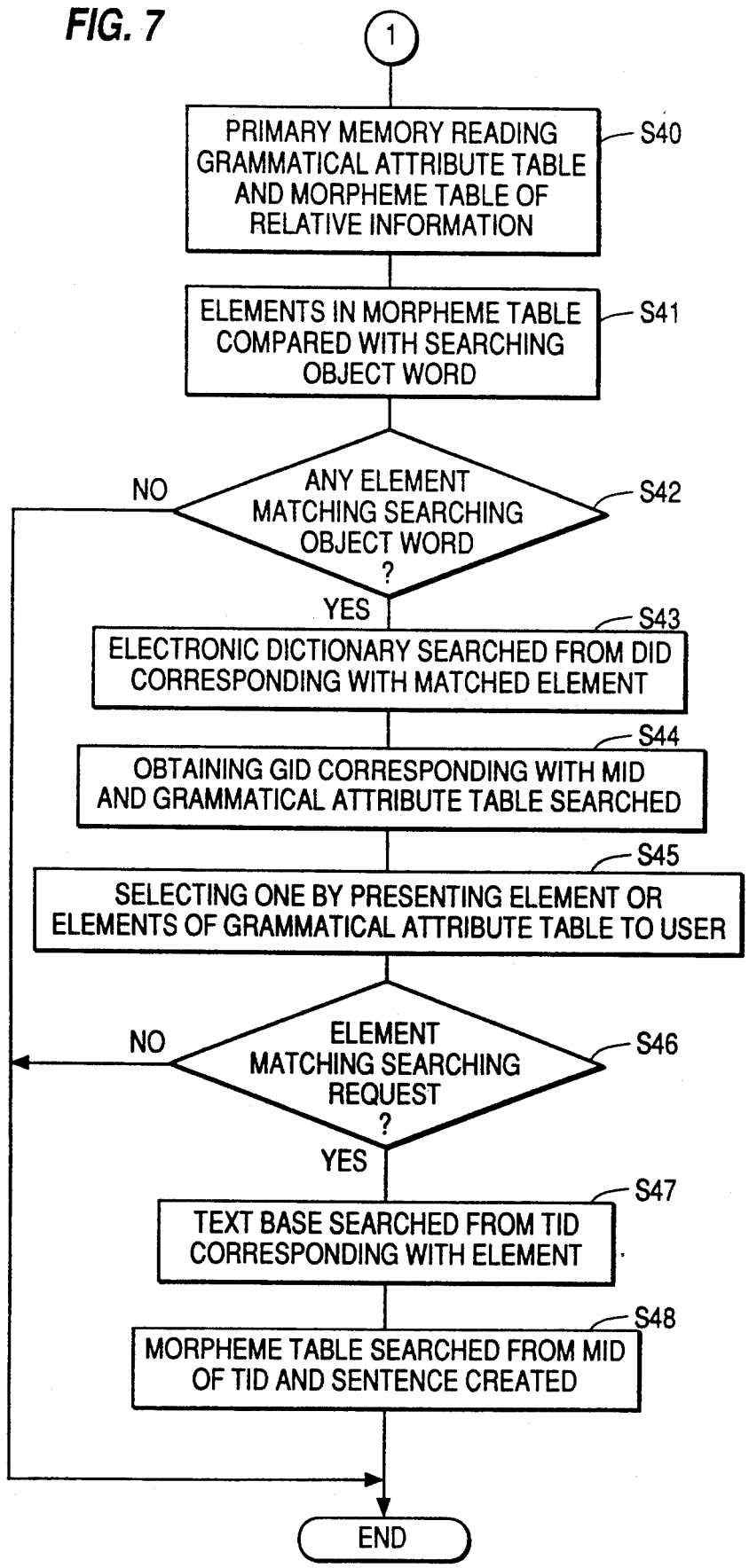
FIG. 7 is a flowchart showing an embodiment of a syntactical level searching process.
Figure 8:
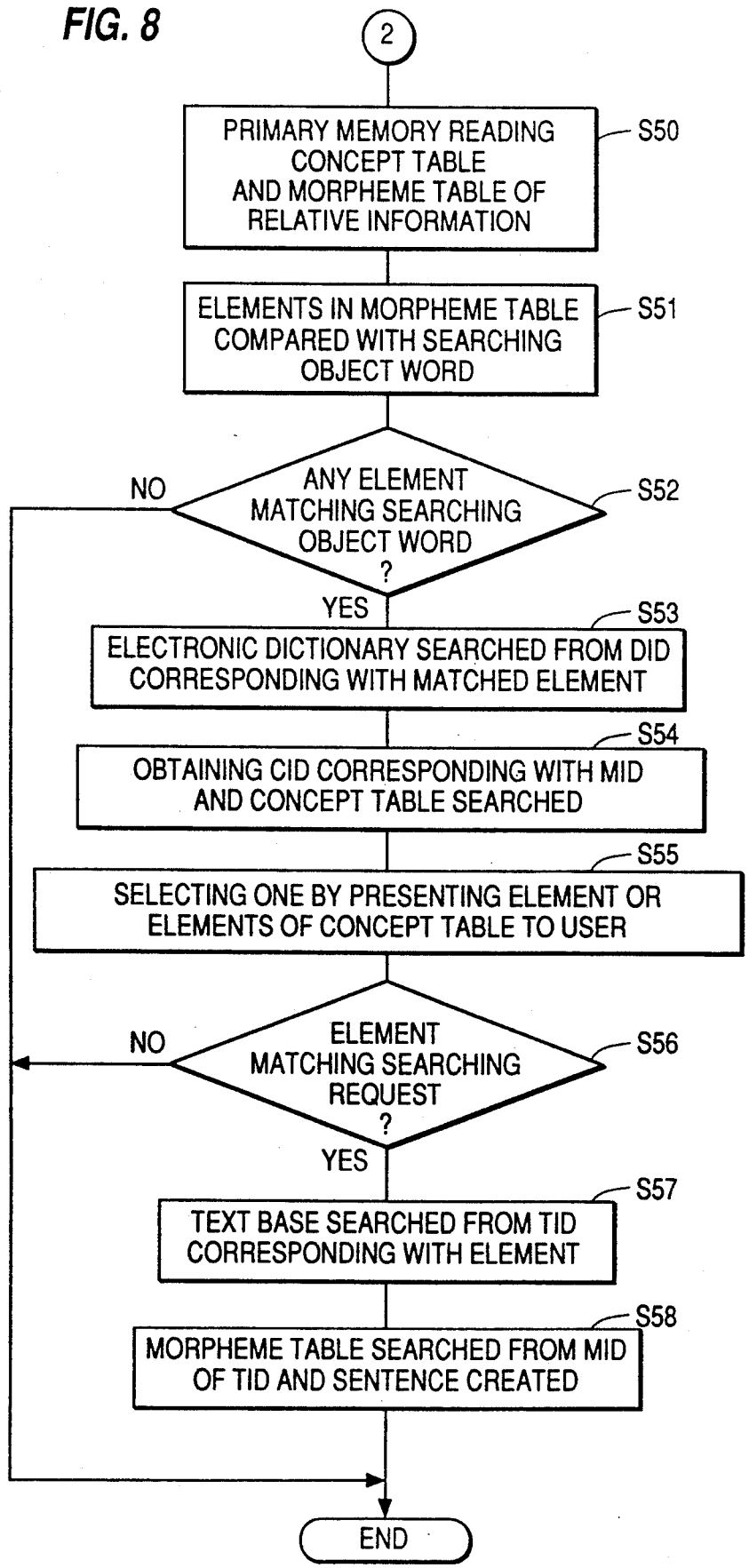
FIG. 8 is a flowchart showing an embodiment of a semantic level searching process.

When the searching level is not at the morpheme level in step 31, the searching level is judged whether or not it is at the syntactical level in step 37. If it is, the syntactical level searching process shown in FIG. 7 is performed. If it is not, it is judged whether or not it is at the semantic level in step 38. If it is, the searching processing at the semantic level shown in FIG. 8 is executed. If it is not, the process is terminated. Also, the searching process is terminated when the element matching the searched object word is not detected in step 34.

FIG. 7 is a flowchart for the embodiment of the searching process at the syntactical level. The primary memory device 24 reads the morpheme table 16 and the grammatical attribute table 17 in the relative information part 3 for the searching process in step 40. The elements in the morpheme table 16 and the searched object word are compared in step 41.

When one of the elements in the morpheme table 16 is detected to match the searched object word in step 42, the electronic dictionary 2 is searched using the dictionary identifier DID for the item corresponding to the element in step 43. The grammatical attribute table 17 is searched by using the grammatical attribute identifier GID for the item searched in step 44.

No less than one element in the grammatical attribute table 17 corresponding to the grammatical attribute identifier GID is shown to the user in step 45, and the element matching the user's searching request is selected in step 46. The text base 1 is searched using the text identifier TID corresponding to the element matching the searching request in step 47. The morpheme table 16 is searched using the morpheme column for the searched text and after the text is created the processing is terminated in step 48. When no element matching the searched object word exists in step 42 or it is not selected in step 46, the processing is terminated.

FIG. 8 is a flowchart for the embodiment of the searching processing at the semantic level. First, the primary memory device 24 reads the morpheme table 16 and the concept table 18 in the relative information part 3 for the searching processing in step 50. The searched object word and the elements in the morpheme table 16 are compared in step 51. The element matching the searched object word is detected in step 52.

The electronic dictionary 2 is searched by using the dictionary identifier DID for the element in the morpheme table 16 matching the searched object word in step 53. The concept table 18 is searched by using the concept identifier CID of the searched item in step 54. When two semantically different concepts exist for an item in the electronic dictionary 2, since the elements in the concept table 18 are also plural, no less than one element in the concept table 18 is presented to the user in step 55. The user selects the element matching the searching request in step 56.

The text identifier TID for the element matching the searching request from the user in the concept table 18 is used for searching the text base 1 in step 57. The morpheme identifier MID for the searched text is used for searching the morpheme table 16 and for creating the text. The processing is then terminated in step 58. When the judging result in step 52 or step 56 is "NO", the processing is immediately terminated.

Figure 9:
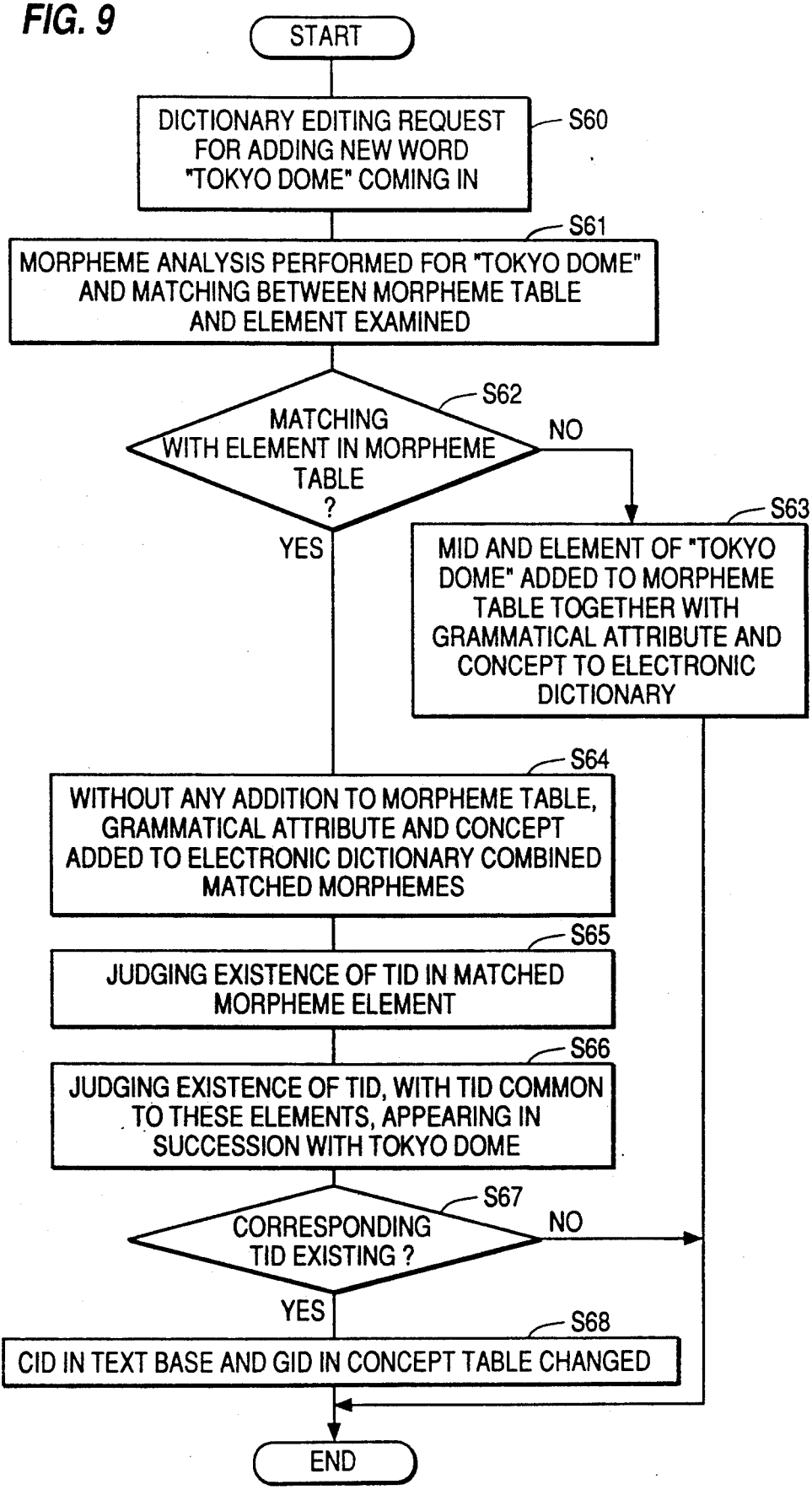
FIG. 9 is a flowchart showing an embodiment of an electronic dictionary editing process.

FIG. 9 is a flowchart for the embodiment for the editing processing of the electronic dictionary 2. Here, the editing processing for adding a new item, "Tokyo Dome", to the electronic dictionary 2 is explained. A dictionary editing request for adding the new item "Tokyo Dome" is detected in step 60. A morpheme analysis of "Tokyo Dome" such as its division into two morphemes "Tokyo" and "Dome" is performed and it is examined whether or not each morpheme matches any element in the morpheme table 16 in step 61. When it does not match any element in the morpheme table 16 in step 62, a morpheme identifier MID and an element are added to the morpheme table 16 by treating "Tokyo Dome" as one morpheme and the item is added to the electronic dictionary 2 together with the grammatical attribute identifier GID and the concept identifier CID and the processing is terminated in step 63.

When all of the plurality of morphemes have undergone morpheme analyses to match the elements in the morpheme table 16 in step 62, the a new item is added to the electronic dictionary 2 together with the grammatical attribute identifier GID and the concept identifier CID in a complex format of the matched morphemes in step 64. The text identifier TID for the element corresponding to the matched morpheme is examined in the morpheme table 16 in step 65. It is examined whether or not a text identifier TID appears in an "as is" continuous format of "Tokyo Dome" common to all these elements in step 66.

It is judged whether or not a corresponding text identifier TID exists in step 67. If it does, the concept identifier CID corresponding to the text identifier is changed in the text base 1, the corresponding text identifier TID is changed in the concept table 18, and the processing is terminated in step 68. When there is no corresponding text identifier TID in step 67, the processing is immediately terminated.

Figure 10:
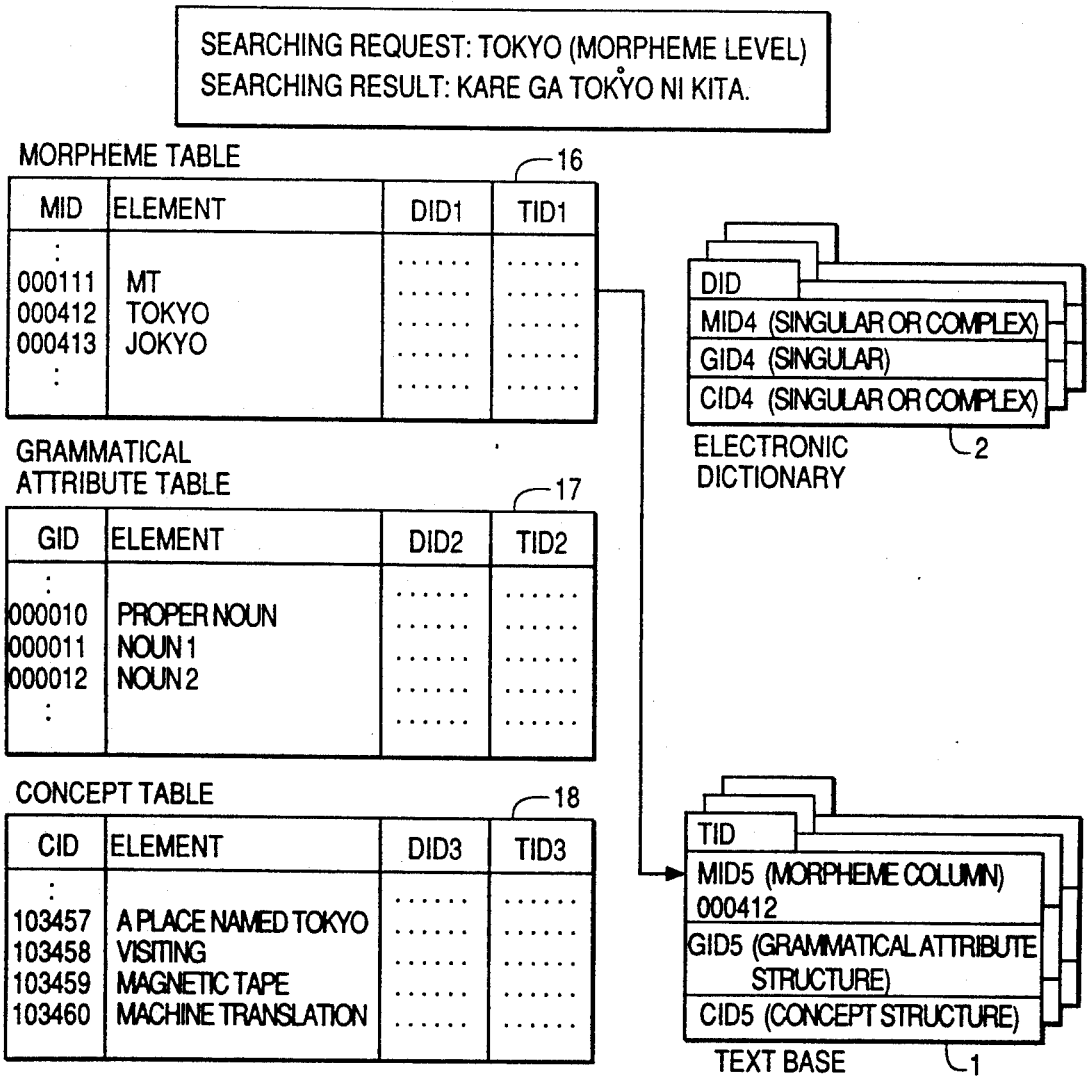
FIG. 10 is a diagram showing an embodiment of a morpheme level searching process.

FIG. 10 shows the embodiment of a text searching when the searching level is the morpheme level. For example, when a search for "Tokyo" is requested by a morpheme level designation by referring to the morpheme identifier MID (000412) from the morpheme table 16, the text base 1 is directly searched. In this example, the text "KARE GA TOKYO NI KITAλ (He came to Tokyo.)" is requested as a searched result.

Figure 11:
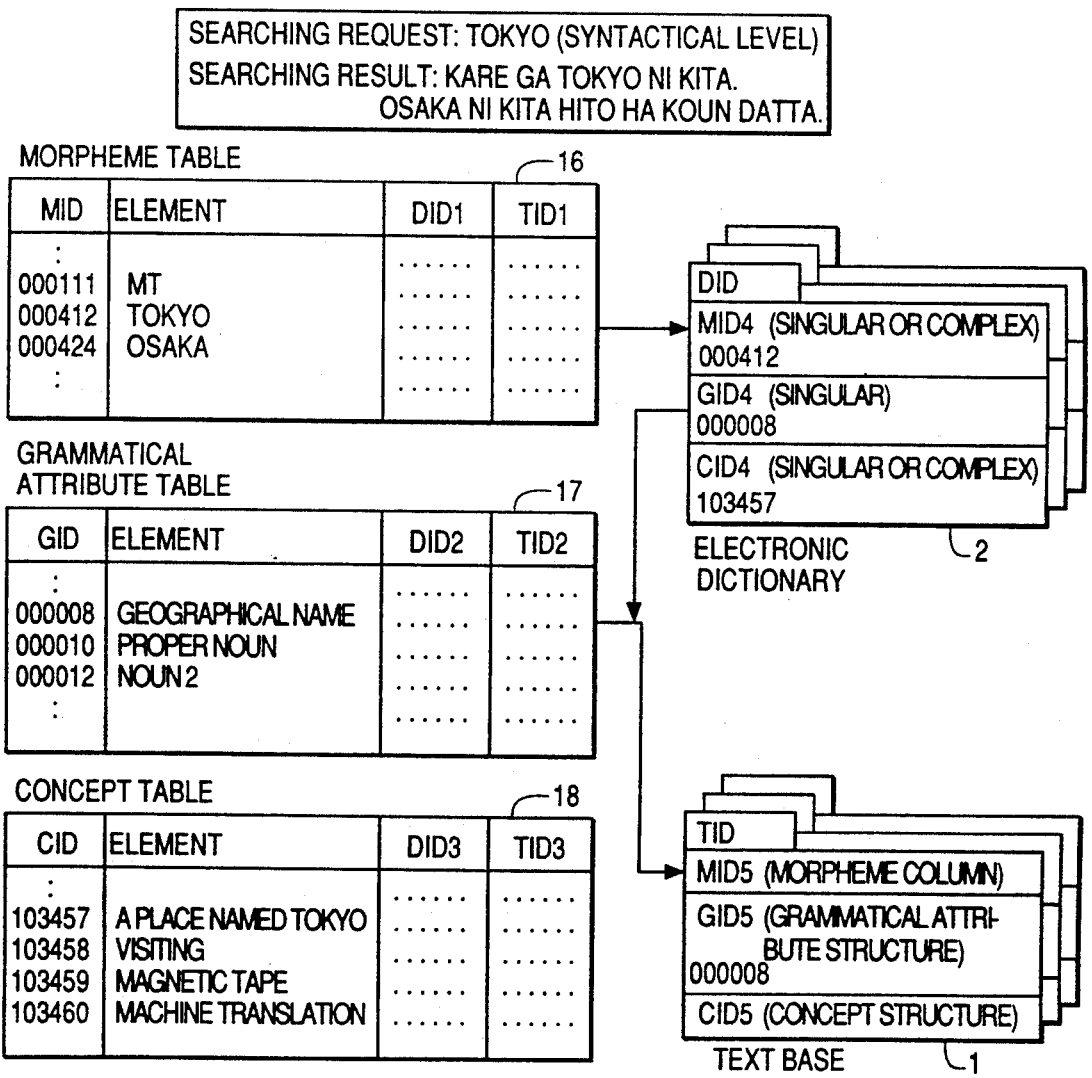
FIG. 11 is a diagram showing an embodiment of a syntactical level searching process.

FIG. 11 shows an embodiment of a text searching when the searching level is the syntactical level. For example, when a search for "Tokyo" is requested by a syntactical level designation, by referring to the electronic dictionary 2 from the morpheme identifier MID (000412) obtained from the morpheme table 16, its grammatical attribute identifier GID4 (000008) is obtained. Further, from the grammatical attribute identifier GID4 (000008), by referring to the grammatical attribute table 17, the text identifier TID2 for the element is obtained and the text base 1 is searched. Here, since "Tokyo" and "Osaka" have the same grammatical attribute, texts such as "KARE GA TOKYO NI KITAλ (He came to Tokyo.)" and "OSAKA NI KITA HITO HA KOUN DATTAλ (Those who come to Osaka were happy.)" are obtained as searched results.

FIG. 12 shows an embodiment of a text search when the search level is the semantic level of a multivocal word. For example, when a search for "MT" is requested by a semantic level (multivocal word) designation, by referring to the electronic dictionary 2 from the morpheme identifier MID (000111) obtained from the morpheme table 16, its concept identifier CID4 (103459/103460) is obtained. Further, their elements are obtained from the concept identifier CID4 (103459/103460), by referring to the concept table 18. Here, because there are two elements, the user confirms whether the requests are of a concept meaning a "magnetic tape" or a concept meaning a "machine translation". If the concept meaning a "machine translation" is selected, its corresponding text identifier TID3 is used for searching the text base 1 and the text is obtained.

In this example, the text "MT is a threat to a translator." is outputted as the searched result, and the text "MT memorizes." is omitted from the searched object.

FIG. 13 shows an embodiment of a text search when the searched level is an included word of the semantic level. For example, when a search for "Tokyo" is requested by a semantic level (included word) designation, its concept identifier CID4 (103457) is obtained by referring to the electronic dictionary 2 from the morpheme identifier MID (000412) obtained from the morpheme table 16. Further from the concept identifier CID4 (103457), the text identifier TID3 for the element is obtained by referring to the concept table 18. After the user confirms whether the concept matches the searching request, the text base 1 is searched to find the text.

Here, because the phrase "JOKYO" comprises a concept of "a place named Tokyo" and a concept of "visiting", even if the searching request does not specify the phrase "coming to Tokyo", such a word is selected as one of the searched objects. In this example, the texts "KARE GA TOKYO NI KITAλ (He came to Tokyo.)" and "KOKYO NO YUJIN GA TOKYO HE KITAλ (A friend in the country came to Tokyo.)" are outputted as searched results.

In the above searching requests, processes for respective requests at the morpheme level, the syntactical level and the semantic level are explained above. However, it is possible to designate a plurality of search levels for a plurality of words, so that requests combined by an "AND" condition or an "OR" condition are similarly processed. In this case, the searched result as a text created and designated by the text identifier TID is outputted only with its text identifier TID limited by the "AND" condition or the "OR" condition, and no special processing is required.

FIG. 14 shows an embodiment in which the text base 1 is changed by linking with the dictionary editing request. For instance, assume there is a request to add a new item "Tokyo Dome" to the electronic dictionary 2. In the morpheme table 16, a combination of existing elements "Tokyo" and "Dome" can define "Tokyo Dome", but an addition is made to the concept table 18.

Therefore, as shown in FIG. 14, the added concept "a baseball field named Tokyo Dome" (CID=557868) is reflected in the text base 1, and a partial deletion as a change in its related DID3 and TID3 is performed for the existing divided concepts (CID=009856, 103457). What is deleted here is what has so far been used as "Tokyo Dome", and what are used as "Tokyo" and "Dome" are left undeleted. Thus, the change in the electric dictionary 2 is reflected in the existing text base 1, and the searched result is realized with a higher degree of accuracy.

The dictionary linked text base of this invention enables text searchings at various levels and can be used for lingual processings such as those for natural languages.

What is claimed is:

1. A dictionary-linked text base apparatus for enabling a text search at a morpheme level in which, for a searched object word inputted in a form of a morpheme, all texts including the morpheme become searched objects, a text search at a syntactical level in which all texts related to a grammatical attribute of a registered item which is either the morpheme or a combination thereof in the dictionary-linked text base apparatus, become searched objects, a text search at a semantic level in which all texts related to at least one of the registered items become searched objects, said dictionary-linked text base apparatus having a function of searching a text in a text base comprising:

an electronic dictionary including information comprising:
- a morpheme identifier the same as an item being searched or a combination comprising a plurality of morphemes forming said item;
- a grammatical attribute identifier of said item; and
- a concept identifier of said item, corresponding to an identifier for each registered item; and a relative information part, operatively connected to said electronic dictionary, having an identifier for a related text in the text base and having an identifier for a related text in said electronic dictionary for each said morpheme identifier, said grammatical attribute identifier and said concept identifier appearing in said electronic dictionary.

2. A dictionary-linked text base apparatus according to claim 1, further comprising:
- an input/output controlling part for controlling inputs and outputs including a man-machine interface;
- a search controlling part, operatively connected to said input/output controlling part, for performing a control related to a search processing;
- a dictionary editing part, operatively connected to said input/output controlling part, for performing an edit processing control of said electronic dictionary;
- a text editing part, operatively connected to said input/output controlling part, for performing an edit processing control of a text in said text base; and
- a data controlling part, operatively connected to said search controlling part, said dictionary editing part, and said text editing part, including said electronic dictionary, relative information part and text base.

3. A dictionary-linked text base apparatus according to claim 2, further comprising:
- an input/output including a first part of said input/output controlling part;
- a controlling device, operatively connected to said input/output device, including a second part of said input/output controlling part, said searching controlling part, said dictionary editing part, and said text editing part;
- a secondary memory device, operatively connected to said data controlling device, for storing all information in said data controlling part; and
- a primary memory device, operatively connected between said controlling device and said secondary memory device, for storing only the information necessary for processing information of said data controlling part stored in said secondary memory device.

4. A dictionary-linked text base apparatus according to claim 1 wherein:
- said grammatical attribute identifier corresponding to an identifier of the item in said electronic dictionary is singular; and
- either one of said morpheme identifier and said concept identifier can be in a complex form in which a plurality of respective identifier is sequenced, while at least an other one of said morpheme identifier and said concept identifier must be in a singular form in which only one respective identifier is used.

5. A dictionary-linked text base apparatus according to claim 1 wherein said relative information part comprises:
- a morpheme table, operatively connectable to said electronic dictionary and said text base, for storing an item identifier in said electronic dictionary and a text identifier in said text base, corresponding to said morpheme identifier;
- a grammatical attribute table, operatively connectable to said electronic dictionary and said text base, for storing said item identifier in said electronic dictionary and said text identifier in said text base, corresponding to a said grammatical attribute identifier; and
- a concept table, operatively connectable to said electronic dictionary and said text base, for storing the item identifier in said electronic dictionary and the text identifier in said text base, corresponding to said concept identifier.

6. A dictionary-linked text base apparatus according to claim 5 wherein:
- said text base stores a sequence of said morpheme identifiers in said text, a sequence of said grammatical attribute identifiers, and a relationship of said concept identifiers, corresponding to identifiers of respective text.

7. A dictionary-linked text base apparatus according to claim 6 wherein:
- when a searching level is a morpheme level, a primary memory device for a searching process reads said morpheme table in said relative information part, the elements in said morpheme table are compared with a morpheme which is a searched object word, said text base is searched by using the text identifier corresponding to said morpheme identifier of an element matching said searched object word, and a text is created by searching a morpheme table using the morpheme identifiers sequenced in correspondence with the identifier for the searched text.

8. A dictionary-linked text base apparatus according to claim 6 wherein:
- when a searching level is a syntactical level, a primary memory device for a searching process reads said morpheme table and said grammatical attribute table in said relative information part, the elements in said morpheme table are compared with a morpheme which is a searched object word, said electronic dictionary is searched by using an identifier for an item in said electronic dictionary corresponding to the identifier for the element matching said searched object word, said grammatical attribute table is searched by using said grammatical attribute identifier corresponding to the identifier for the searched item, and by presenting at least one element searched in the grammatical attribute table, it is determined whether said element and a user's searching request match;
- said text base is searched by using a text identifier corresponding to said grammatical attribute identifier of an element in said grammatical attribute table matching the user's searching request, and a text is created by searching the morpheme table using the morpheme identifiers sequenced in correspondence with the identifiers for the searched text.

9. A dictionary-linked text base apparatus according to claim 6 wherein:

when a searching level is a semantic level, a primary memory device for a searching processing reads said morpheme table and said concept table in said relative information part, the elements in said morpheme table are compared with a morpheme which is a searched object word, said electronic dictionary is searched by using the identifier for the item in said electronic dictionary corresponding with said morpheme identifier for the element matching said searched object word, and said concept table is searched using said concept identifier corresponding to the identifier for said searched item, by presenting at least one element searched in said concept table, it is determined whether said element and the user's searching request match, said text base is searched using the text identifier corresponding to said concept identifier of the element matching the user's searching request;

a text is created by searching said morpheme table, by using said morpheme identifiers sequenced with the identifier for the searched text.

10. A dictionary-linked text base apparatus according to claim 6 wherein:

when there is a dictionary editing request for adding a new item, it is determined whether at least one morpheme forming the new item matches an element in said morpheme table, if no element in said morpheme table matches, said new item is added to said morpheme table as its new item, together with said morpheme identifier and the identifier for the item in said electronic dictionary corresponding to said morpheme identifier, and the new item is added in said electronic dictionary, together with said identifier for the item, and said grammatical attribute identifier and said concept identifier corresponding to said the identifier for the item;

if an element in said morpheme table matches, the new item is added to said electronic dictionary, together with said grammatical attribute identifier and said concept identifier, in a form of the matched morpheme complex, it is determined whether there is a text identifier corresponding to the matched morpheme identifier in said morpheme table; it is determined whether there is a text, having a common text identifier corresponding to the matched plurality of morpheme identifiers, in which the new item word appears, and when there is such a text, said concept identifier corresponding to said identifier for the text in said text base and said text identifier in said concept table is changed.

11. A dictionary-linked text base apparatus for enabling a text search at a morpheme level in which, for a searched object word inputted in a form of a morpheme, all texts including the morpheme become searched objects, a text search at a syntactical level in which all texts related to a grammatical attribute of a registered item which is either the morpheme or a combination thereof in the dictionary-linked text base apparatus, become searched objects, a text search at a semantic level in which all texts related to at least one of the registered items become searched objects, said dictionary-linked text base apparatus having a function of searching a text in a text base comprising:

an electronic dictionary including information, comprising:

a morpheme identifier the same as an item being searched or a combination comprising a plurality of morphemes forming said item;

a grammatical attribute identifier of said item; and a concept identifier of said item, corresponding to an identifier for each registered item; and a relative information part, operatively connected to said electronic dictionary, having an identifier for a related text in the text base and having an identifier for a related text in said electronic dictionary for each said morpheme identifier, said grammatical attribute identifier and said concept identifier appearing in said electronic dictionary, said relative information part comprising:

a morpheme table, operatively connected to said electronic dictionary and said text base, for storing said item identifier in said electronic dictionary and a text identifier in said text base, corresponding to said morpheme identifier;

a grammatical attribute table, operatively connected to said electronic dictionary and said text base, for storing said item identifier in said electronic dictionary and said text identifier in said text base, corresponding to said grammatical attribute identifier; and a concept table, operatively connected to said electronic dictionary and said text base, for storing the item identifier in said electronic dictionary and the text identifier in said text base, corresponding to said concept identifier.

* * * * *

UNITED STATES PATENT AND TRADEMARK OFFICE
CERTIFICATE OF CORRECTION

PATENT NO. : 5,151,857
DATED : SEPTEMBER 29, 1992
INVENTOR(S) : KUNIO MATSUI

It is certified that error appears in the above-identified patent and that said Letters Patent is hereby corrected as shown below:

Col. 4, line 62, "IKU$\lambda$" should be --IKU.--.

Col. 5, line 4, "IKU/$\lambda$" should be --IKU.--.

Col. 7, line 32, "KITA$\lambda$" should be --KITA.--;
       line 47, "KITA$\lambda$" should be --KITA.--;
       line 48, "DATTA$\lambda$" should be --DATTA.--.

Col. 8, line 19, "KITA$\lambda$" should be --KITA.--;
       line 21, "KITA$\lambda$" should be --KITA.--.

Col. 9, line 64, "identifier" should be --identifiers--.

Signed and Sealed this

Second Day of November, 1993

Attest:

BRUCE LEHMAN

Attesting Officer     Commissioner of Patents and Trademarks